US009992090B2

(12) United States Patent
Nayyar et al.

(10) Patent No.: US 9,992,090 B2
(45) Date of Patent: Jun. 5, 2018

(54) DATA METRICS ANALYTICS

(71) Applicant: Bank of America Corporation, Charlotte, NC (US)

(72) Inventors: Ashish K. Nayyar, Hyderabad (IN); Amit Subhash Dixit, Hyderabad (IN); Trivikram Piduru, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 511 days.

(21) Appl. No.: 14/150,252

(22) Filed: Jan. 8, 2014

(65) Prior Publication Data

US 2015/0195157 A1 Jul. 9, 2015

(51) Int. Cl.
*H04L 12/24* (2006.01)
*H04L 12/26* (2006.01)
(Continued)

(52) U.S. Cl.
CPC .......... *H04L 43/0852* (2013.01); *G06F 11/00* (2013.01); *G06F 11/3409* (2013.01); *G06F 11/3452* (2013.01); *G06F 11/3495* (2013.01); *H04L 41/0681* (2013.01); *G06F 11/3003* (2013.01); *G06F 11/32* (2013.01); *G06F 2201/81* (2013.01); *G06F 2201/865* (2013.01);
(Continued)

(58) Field of Classification Search
CPC .................................. G06F 9/46; H04L 43/04
See application file for complete search history.

(56) References Cited

U.S. PATENT DOCUMENTS 7,392,248 B2  6/2008  Bakalash et al.
7,448,048 B1  11/2008  Nesamoney et al.
(Continued)

OTHER PUBLICATIONS

"Performance Metrics Monitoring with Introscope by Wily"; retrieved online at http://help.sap.com/saphelp_sm71_sp01/helpdata-en-3d/bdd41a171744569b0b39f141d9db3/content.htm, date unknown.
(Continued)

*Primary Examiner* — Scott B Christensen
(74) *Attorney, Agent, or Firm* — Banner & Witcoff, Ltd.; Michael A. Springs (57) ABSTRACT

Aspects of the present disclosure provide systems and methods directed toward identifying causes of attenuated performance at computing systems. Performance data corresponding to performance metrics may be stored at a data store. Performance metrics may be associated with application servers. Alerts may be received from a performance monitoring agent triggered by performance attenuations at the application servers. A timeframe in which a performance attenuation occurred may be selected and the performance data may be searched in order to identify another performance attenuation that occurred at one of the application servers during or before the selected timeframe. Performance data may be evaluated to identify one of the application servers associated with the additional performance attenuation as a potential source of the performance attenuation that triggered the alert. Information corresponding to the potential source of the performance attenuation that triggered the alert may be presented to a user at a display device.

16 Claims, 7 Drawing Sheets

(51) Int. Cl.
  G06F 11/00 (2006.01)
  G06F 11/34 (2006.01)
  G06F 11/30 (2006.01)
  G06F 11/32 (2006.01)
(52) U.S. Cl.
  CPC .. *G06F 2201/875* (2013.01); *G06F 2209/508* (2013.01)

(56) References Cited

U.S. PATENT DOCUMENTS

| | | | |
|---|---|---|---|
| 7,483,968 B1 | 1/2009 | Rambacher et al. | |
| 7,577,731 B2 | 8/2009 | Frey et al. | |
| 7,930,262 B2 | 4/2011 | Friedlander et al. | |
| 7,930,595 B2 | 4/2011 | Gooding | |
| 8,015,176 B2 | 9/2011 | Colby et al. | |
| 8,209,274 B1 | 6/2012 | Lin et al. | |
| 8,271,537 B2 | 9/2012 | Schabenberger et al. | |
| 8,418,000 B1* | 4/2013 | Salame | G06F 11/079 714/26 |
| 8,437,987 B2 | 5/2013 | Verseput et al. | |
| 8,463,736 B2 | 6/2013 | Bakalash et al. | |
| 8,464,278 B2 | 6/2013 | Nesamoney et al. | |
| 8,495,007 B2 | 7/2013 | Williamson | |
| 2003/0065986 A1* | 4/2003 | Fraenkel | G06F 11/3006 714/47.2 |
| 2005/0193225 A1* | 9/2005 | MacBeth | G06F 11/0709 714/2 |
| 2005/0262323 A1 | 11/2005 | Woo et al. | |
| 2006/0171523 A1* | 8/2006 | Greenwell | H04W 4/00 379/242 |
| 2006/0178982 A1 | 8/2006 | Ramsey et al. | |
| 2008/0270851 A1* | 10/2008 | Ochi | G06F 11/3466 714/47.2 |
| 2009/0037914 A1 | 2/2009 | Chagoly et al. | |
| 2009/0271511 A1 | 10/2009 | Peracha | |
| 2010/0302248 A1* | 12/2010 | Houghtlin | G06Q 10/0637 345/440 |
| 2011/0035485 A1 | 2/2011 | Martin et al. | |
| 2012/0108225 A1* | 5/2012 | Luna | H04L 12/66 455/418 |
| 2013/0219068 A1 | 8/2013 | Ballani et al. | |
| 2013/0322255 A1 | 12/2013 | Dillon | |
| 2014/0089621 A1 | 3/2014 | Hagspiel et al. | |
| 2014/0237297 A1* | 8/2014 | Nagura | G06F 11/079 714/39 |
| 2015/0009840 A1* | 1/2015 | Pruthi | H04L 43/106 370/252 |
| 2015/0222516 A1 | 8/2015 | Deval et al. | |

OTHER PUBLICATIONS

CA Introscope. IBM. Last Modified Jan. 2, 2014. Retrieved from [http://www-304.ibm.com/partnerworld/gsd/solutiondetails.do?solution=23517&expand=true] on Jan. 27, 2014.

CA Application Performance Management. CA Technologies. Copyright 2014. Retrieved from [http://www.ca.com/us/application-management-details.aspx] on Jan. 27, 2014.

CA Application Performance Management 9.5 Data Sheet. CA Technologies. Copyright 2013. Retrieved from [http://www.ca.com/us/~/media/Files/DataSheets/ca-application-performance-management.PDF] on Jan. 27, 2014.

Oct. 7, 2016—U.S. Notice of Allowance—U.S. Appl. No. 14/150,247.

Jun. 17, 2016—U.S. Non-Final Office Action—U.S. Appl. No. 14/150,247.

Feb. 1, 2016—U.S. Final Office Action—U.S. Appl. No. 14/150,247.

Sep. 16, 2016—U.S. Non-Final Office Action—U.S. Appl. No. 14/150,247.

* cited by examiner

DATA METRICS ANALYTICS

CROSS-REFERENCE TO RELATED APPLICATION

This application is related to commonly owned U.S. patent application Ser. No. 14/150,247 entitled "TRANSACTION PERFORMANCE MONITORING" and concurrently filed on Jan. 8, 2014, which is incorporated by reference in its entirety herein.

BACKGROUND

A business enterprise may deploy a performance monitoring agent to monitor the status and health of its various applications and application servers distributed throughout an enterprise-wide computing system. Once deployed the performance monitoring agent functions to alert management teams of potential problems occurring at the applications and application servers. In response to an alert, a team member may investigate the potential problem and address any technical issues affecting the performance of the application or application server.

Some current approaches to investigating and responding to alerts, however, rely on the manual efforts of the management teams to investigate the potential problems and are therefore time-consuming. In addition, while performance monitoring agents may be useful to provide notifications of potential problems, they do not provide information indicating the source of the potential problem. As a result, some current approaches also rely on the skill of the team member investigating the potential problem to track down and identify its cause.

Therefore a need exists for improved approaches to identifying the cause of attenuated performance at an enterprise computing system.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a computer-implemented method of identifying the cause of attenuated performance at a computing system. Performance data corresponding to performance metrics monitored by a performance monitoring agent may be stored at a data store. Some of the performance metrics may be associated with application servers of a computing system. An alert from the performance monitoring agent may be received. The alert may be triggered by a performance attenuation at one of the servers. A timeframe in which the performance attenuation occurred may be selected. The performance data may be searched in order to identify another performance attenuation that occurred at one of the application servers during or before the selected timeframe. Based on an evaluation of the performance data, one of the application servers associated with the other performance attenuation may be identified as a potential source of the performance attenuation that triggered the alert. Information corresponding to the application server identified as the potential source of the performance attenuation that triggered the alert may be presented to a user at a display device.

A second aspect described herein provides a system for identifying a cause of attenuated performance at a computing system. The system may include at least one processor and a data store that stores performance data corresponding to performance metrics monitored by a performance monitoring agent. Some of the performance metrics may be associated with one or more application servers of a computing system. A detection module may be configured to, in operation, automatically locate a potential source of a performance attenuation detected at one of the application servers based on an evaluation of the performance data. A display device may present information corresponding to one of the application servers identified as the potential source of the performance attenuation.

A third aspect described herein provides a computer-implemented method of identifying the cause of attenuated performance at a computing system. Performance data corresponding to performance metrics may be collected using a performance monitoring agent. The performance metrics may be associated with computing resources of the computing system. Computing resources may include applications and application servers that host the applications. A selection of one of the computing resources may be received via a user interface module. A performance attenuation associated with the selected computing resource may be identified based on an evaluation of performance data associated with the selected computing resource. A timeframe in which the performance attenuation occurred may also be identified. One of the performance metrics may be selected and performance data associated with the performance metric selected may be evaluated to determine that another performance attenuation occurred at one of the computing resources during or before the timeframe identified. A computing resource at which the additional performance attenuation occurred may be identified as a potential source of the performance attenuation identified for the selected computing resource. Information corresponding to the computing resource identified as the potential source of the performance attenuation may be presented at a display device. Performance metrics may include a processor usage metric, a memory usage metric, a processor execution time metric, a transaction response time metric, and an active thread count metric.

These and additional aspects will be appreciated with the benefit of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Aspects of the present disclosure are directed toward evaluating performance data collected by a performance monitoring agent while monitoring applications and application servers of an enterprise computing system. The computing systems of some enterprises may include thousands of application servers hosting multiple applications. Various applications may communicate at or between application servers. As a result, attenuated performance at one application may trigger a cascade of downstream performance attenuations at other applications and application servers. The performance monitoring agent may detect attenuated performance at an application or application server and provide an alert to notify a management team of the attenuated performance. The alert may indicate that performance at an application or application server has degraded but provide no indication of the reason for the degraded performance. In some instances the performance attenuation detected at an application or application server may be a symptom of previous attenuated performance upstream of the application or application server.

The performance evaluation system described herein is capable of automatically locating the source of attenuated performance through an analysis of the performance data collected for the applications and application servers of the enterprise computing system. As described in further detail below, the performance evaluation system automatically locates the source of performance attenuations detected at an application or application server by correlating the performance attenuations with other performance attenuations detected for other applications or application servers of the enterprise computing system.

The performance evaluation system described herein also provides other advantages through evaluation of the performance data collected by the performance monitoring agent. As one example, the performance evaluation system described herein may be capable of automatically identifying dependencies between applications through an analysis of the performance data. Based on the dependencies identified, the performance evaluation system may proactively alert management teams to potential attenuated performance at downstream applications or application servers resulting from performance attenuations detected at an upstream application or application server. In addition, the performance evaluation system may be capable of dynamically adjusting performance thresholds used to trigger performance attenuation alerts. In this way, performance attenuation alerts may not be generated where attenuated performance is expected, e.g., due to increased traffic volume or network latency. The performance evaluation system may also provide improved approaches to obtaining aggregate performance evaluations for multiple applications and application servers. Each of these advantages will be described in further detail below.

In practice some enterprises may maintain enterprise-wide computing systems having over twenty thousand application instances and monitor over ten million real-time performance metrics every fifteen seconds for those application instances. In addition the performance data collected may be stored and persist for up to two months for historical review and reporting. It will thus be appreciated that these enterprises may generate huge amounts of performance data through their monitoring efforts. Due to the sheer volume of the performance data generated, it will be appreciated that manual review and evaluation of such data to maintain the enterprise computing system is not feasible. This is particularly true where an enterprise computing system operates on a scale of milliseconds. It will thus be recognized that the automated and programmed processes of computing systems are a significant aspect of the systems and methods used to monitor and evaluate such large amounts of performance data with the speed necessary to provide real-time services to end users.

For the description provided below, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal.

Figure 1:
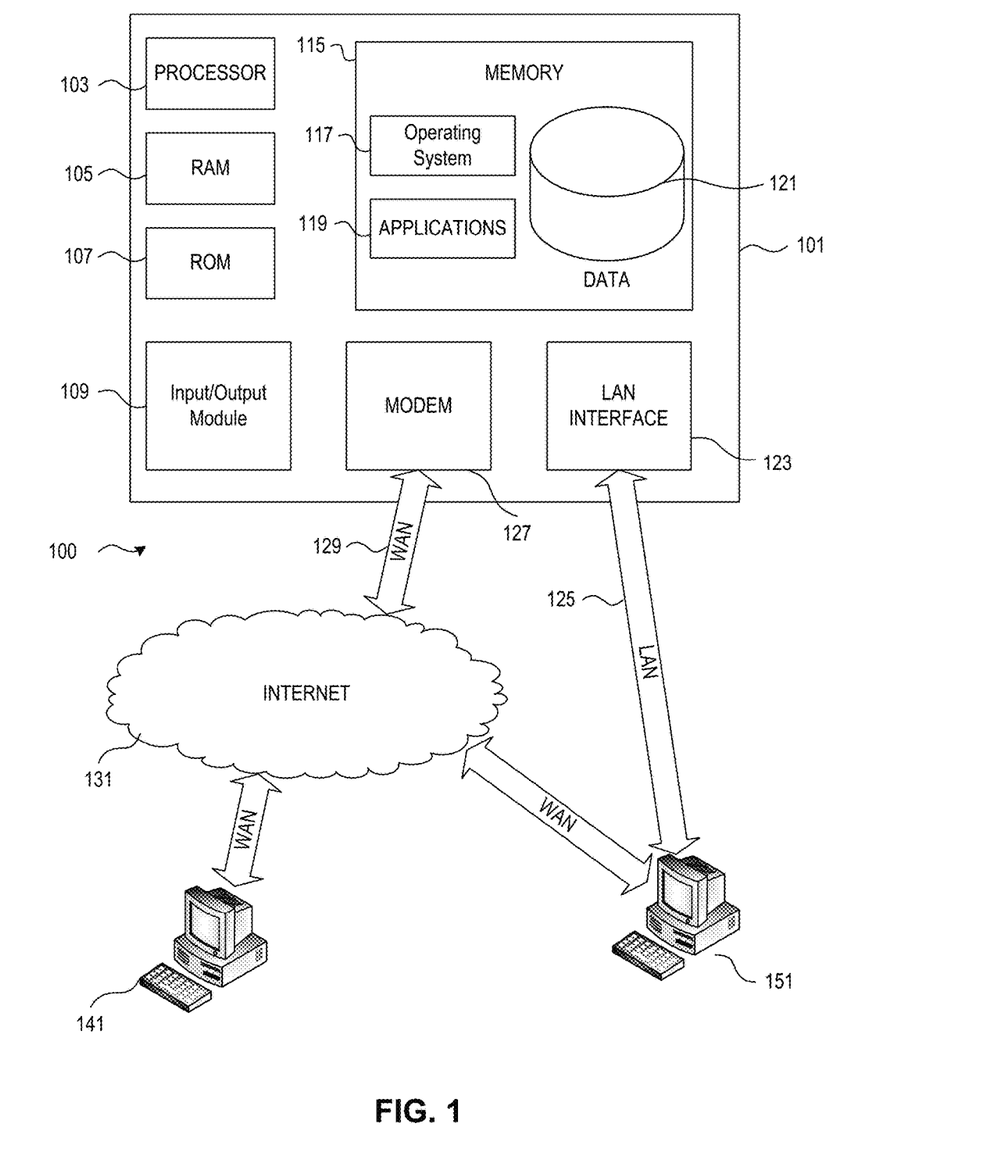
FIG. 1 is a block diagram of an example operating environment in which various aspects of the disclosure may be implemented.

FIG. 1 illustrates a block diagram of at least a portion of a performance evaluation system 101 (e.g., a computer server) in communication system 100 that may be used according to an illustrative embodiment of the disclosure. The system 101 may have a processor 103 for controlling overall operation of the system and its associated components, including RAM 105, ROM 107, input/output (I/O) module 109, and memory 115.

I/O 109 may include a microphone, keypad, touch screen, and/or stylus through which a user of the performance evaluation system 101 may provide input, and may also include one or more of a speaker for providing audio output and a video display device for providing textual, audiovisual and/or graphical output. Software may be stored within memory 115 and/or storage to provide instructions to processor 103 for enabling the system 101 to perform various functions. For example, memory 115 may store software used by the system 101, such as an operating system 117, application programs 119, and an associated database 121. Processor 103 and its associated components may allow the system 101 to run a series of computer-readable instructions to evaluate performance data collected by a performance monitoring agent.

The system 101 may operate in a networked environment supporting connections to one or more remote computers, such as terminals 141 and 151. The terminals 141 and 151 may be personal computers or servers that include many or all of the elements described above relative to the system 101. Alternatively, terminal 141 and/or 151 may be a data store that utilized by the system 101. The network connections depicted in FIG. 1 include a local area network (LAN) 125 and a wide area network (WAN) 129, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as the Internet 131. It will be appreciated that the network connections shown are illustrative and other means of establishing a communications link between the computers may be used. Various well-known protocols such as TCP/IP, Ethernet, FTP, HTTP and the like may be used to establish connections and/or facilitate communications between elements of system 101 and various other computing devices.

Additionally, one or more application programs 119 used by the performance evaluation system 101 according to an illustrative embodiment of the disclosure may include computer executable instructions for evaluating performance data collected by a performance monitoring agent.

The performance evaluation system 101 and/or terminals 141 or 151 may also be mobile terminals, such as smart phones, personal digital assistants (PDAs), and the like, including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
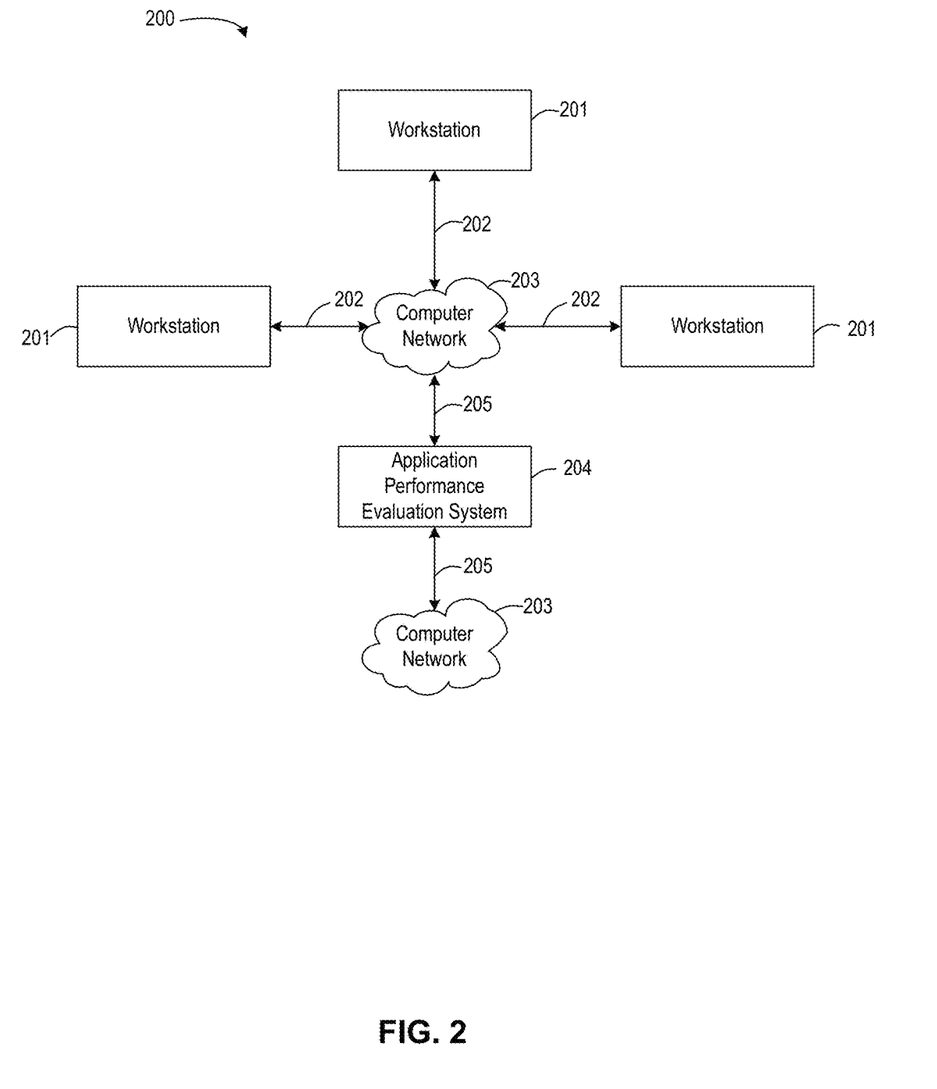
FIG. 2 is a block diagram of example workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the performance evaluation system 204. In certain embodiments, workstations 201 may be different servers that communicate with the performance evaluation system 204, or, in other embodiments, workstations 201 may be different points at which the performance evaluation system 204 may be accessed. In system 200, the performance evaluation system 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the performance evaluation system 204, such as network links, dial-up links, wireless links, hard-wired links, and the like.

The disclosure that follows may be implemented by one or more of the components in FIG. 1 and FIG. 2 and/or other components, including other computing devices.

Figure 3:
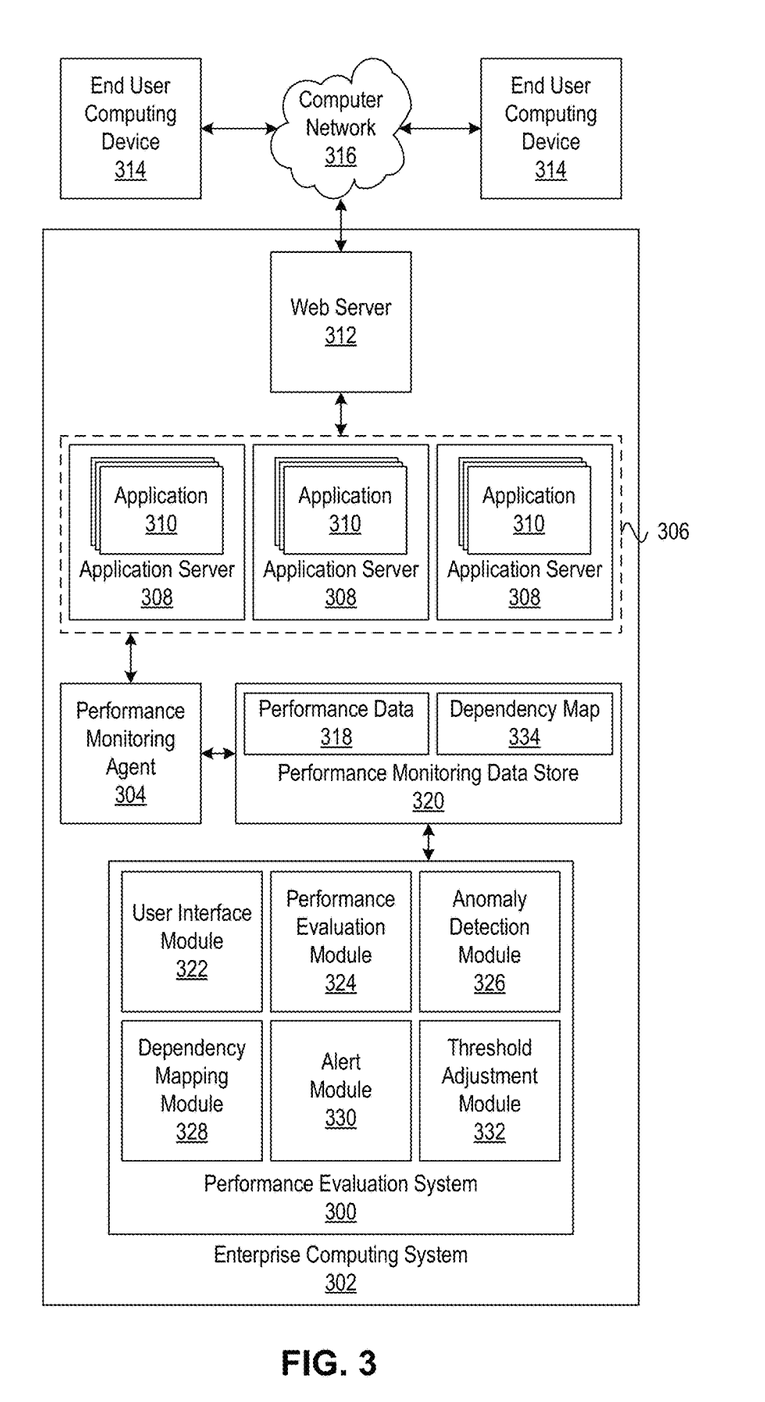
FIG. 3 is an example of an implementation of a performance evaluation system.

Referring now to FIG. 3, an example of an implementation of a performance evaluation system 300 is shown. The performance evaluation system 300 may be deployed at an enterprise computing system 302 of an enterprise, e.g., a banking enterprise. As described above, an enterprise may also deploy a performance monitoring agent 304 at the enterprise computing system 302 in order to monitor a collection of computing resources 306 deployed at the enterprise computing system. Computing resources may refer to both applications and application servers that host applications. Individual application servers 308 may host one or more applications 310. The enterprise computing system 302 may also include a web server 312 through which the collection of computing resources 306 is accessible at an end-user computing device 314. The end-user computing devices 314 may be in signal communication with the web server 312 via a communication network 316, e.g., the Internet.

While monitoring the collection of computing resources 306, the performance monitoring agent 304 may collect performance data 318 respectively associated with individual application servers 308 of the enterprise computing system 302 as well as individual applications 310 of an application server. The performance monitoring agent 304 may store the performance data 318 at a performance monitoring data store 320. The performance evaluation system 300 may query the performance monitoring data store 320 to selectively retrieve the performance data 318 for evaluation. The performance data may correspond to various performance metrics monitored by the performance monitoring agent 304. Performance metrics may be associated with the applications 310 or the application servers 308. Because the application servers 308 host the applications 310, a performance metric associated with an application may also be characterized as associated with the application server that hosts the application.

The performance evaluation system 300 may include various modules configured to facilitate evaluation of the performance data 318. The performance evaluation system 300, in this example, includes a user interface module 322, a performance data evaluation module 324, an anomaly detection module 326, a dependency mapping module 328, an alert module 330, and a threshold adjustment module 332. Each of these modules will be described in further detail below.

Various modules of the performance evaluation system 300 may be implemented using an open-source framework having a distributed file system and configured for parallel processing using map-reduce techniques. These modules may also be implemented using an open source, nonrelational, columnar, distributed database for storing evaluation results. In these example implementations, the modules may provide real-time read/write access to large data sets. The modules may also include various scripts to implement the map-reduce techniques used to evaluate the performance data 318. The modules may utilize a job scheduler to execute the map-reduce scripts, e.g., as a cron job or batch job.

The performance monitoring data store 320 may include one or more data stores. One of the data stores of the performance monitoring data store 320 may receive and store the performance data obtained by the performance monitoring agent 304. Another one of the data stores of the performance monitoring data store may be the distributed file system utilized by the modules when evaluating the performance monitoring data 318. The performance data 318 may be pushed to the distributed file system once collected by the performance monitoring agent 304. The evaluation results may also be stored at the distributed file system. The example implementations described above may provide an evaluation platform that is both economical and scalable depending on the needs of the enterprise.

Aspects of the present disclosure may be implemented in a variety of different contexts for which an enterprise establishes and maintains an enterprise computing system to provide various services to end users. One example context includes the banking context in which the enterprise computing system 302 may be one of the computing systems of a banking enterprise. In the context of a banking enterprise, the applications 310 hosted at the application servers 308 may provide various banking-related services, e.g., account transactions, credit card processing, and other banking-related services that will be appreciated to those skilled in the art. The performance evaluation system 300 described herein advantageously enables an enterprise to quickly address any technical issues that affect the performance of these applications thereby ensuring a favorable user-experience for the end users.

The performance monitoring agent 304 may be a commercially available performance monitoring agent configured for real-time monitoring, analysis, and reporting on transactions performed by the applications 310 distributed across application servers 308 of the enterprise computing system 302. As used in this description, applications 310 refer to executables residing at an application server 310 and may include, for example, programs, web services, servlets, applets, scripts, web-applications, and other types of executables that will be appreciated by those skilled in the art. While monitoring the applications 310 and application servers 308, the performance monitoring agent 304 may collect performance data 318 corresponding to the performance metrics and store the performance data at the performance monitoring data store 320. Performance data 318 may include, e.g., both numerical values and text values.

The performance monitoring agent 304 may also be configured to provide alerts in response to performance attenuations detected at an application 310 or an application server 308. A performance attenuation as used in this description includes an instance in which a performance metric crosses a performance threshold. Performance attenuations may be observed where, for example, a processor usage exceeds a processor usage threshold and where a transaction response time exceeds a transaction time threshold. Accordingly the performance monitoring agent 304 may include various performance thresholds for comparison to current performance metrics monitored for the applications 310 and application servers 308. As performance attenuations correspond to degraded performance at an application or application server, a performance attenuation may also be referred to as a performance degradation.

The performance metrics may relate to various aspects associated with operating the applications 310 at the application servers 308. Some performance metrics may relate to resource utilization at an application server 308 and include, for example, a processor usage metric that measures a percentage of processor usage at an application server, a memory usage metric that measures a percentage or absolute usage of memory at the application server, and other types of resource utilization metrics that will be appreciated by those skilled in the art. Some performance metrics may also relate to operation of an application 310 or an application server 308 and include, for example, a transaction response time at an application, a processor execution time at a processor of an application server, an active thread count, and other types of operation metrics that will be appreciated by those skilled in the art.

Once stored at the performance monitoring data store 320, the performance data 318 is available for evaluation by the performance evaluation system 300. The performance evaluation system 300 may query the performance monitoring data store 320 to retrieve the performance data 318 for evaluation. The performance evaluation system 300 may retrieve the performance data 318 automatically or in response to user input, e.g., via the user interface module 322. The user interface module 322 may be implemented as a dashboard that provides a user-friendly view of the application servers 308 and applications 310 hosted at the application servers. The user interface module 322 may be configured to, in operation, receive a selection of an application 310 or an application server 308 to view performance data associated with the selected application or application server.

The user interface module 322 may also be configured to receive queries from an administrator regarding applications 310 or application servers 308 selected at the user interface module 322. In response to a query, the performance evaluation module 324 may retrieve performance data 318 from the performance monitoring data store 320, evaluate the performance data and present the evaluation results to the administrator, e.g., at a display device. Some types of performance monitoring agents may provide the ability to perform queries on performance data collected, e.g., using a structured query language. These performance monitoring agents, however, permit users to execute any type of query operation available using the structured query language. As a result, there is the potential for inexperienced users to bring a halt to the system through an inadvertent computationally-expensive query that consumes the resources of the system. In order to prevent such inadvertent queries, the user interface module 322, in this example, provides a limited set of query operations that do not include operations that could potentially consume the resources of the performance monitoring agent 304, the performance monitoring data store 320, or the performance evaluation system 300. In this way, the performance evaluation system 300 is advantageously configured to allow relatively inexperienced users to assess the status and health of the applications 310 and application servers 308 of the enterprise computing system 302.

One example query an administrator may perform via the user interface module 322 involves determining an average uptime for an application 310 or application server 308. In some implementations multiple instances of an application 310 may be deployed across multiple application servers 308. In some implementations, application servers 308 may be grouped together in an application cluster based on, e.g., the types of applications hosted at the application servers, geographic location, and other criteria that will be appreciated by those skilled in the art. Accordingly an administrator may select through user interface module 322 an application 310, application server 308, or application cluster as well as a timeframe to determine the average uptime for, e.g., the previous day, week, month, and so forth. The performance data 318 may include information indicating when the application 310, application server 308, or application cluster was unavailable. The performance evaluation module 324 may retrieve this performance data for the selected timeframe, evaluate the performance data to determine the average uptime, and display the results via the user interface module 322. The performance evaluation module 324 may be configured to perform other types of performance evaluations based on the performance data 318 that will be appreciated with the benefit of this disclosure.

The anomaly detection module 326 may be configured to, in operation, locate a potential source of attenuated performance detected at one of the application servers 308 based on an evaluation of the performance data 318. The attenuated performance detected at the application server 308 may be associated with the application server itself (e.g., increased resource utilization) or may be associated with one of the applications 310 hosted at the application server (e.g., increased response time). As noted above, attenuated performance detected at an application server 308 may be a symptom of attenuated performance that occurred at another application or application server during or before the timeframe in which the attenuated performance detected occurred. Accordingly, the detection module 326, in this example, is configured to automatically locate the potential source of the attenuated performance by searching the performance data 318 for additional attenuated performance that correlates with the attenuated performance. If the anomaly detection module 326 locates additional attenuated performance at another application 310 or application server 308, then the anomaly detection module may identify that application or application server as a potential source of the attenuated performance. The anomaly detection module 326 may determine that performance attenuations correlate with each other when the performance attenuations occur within the same timeframe. Stated differently, the anomaly detection module 326 may determine that performance attenuations correlate with each other when the performance attenuations occur within a predetermined time period of one another, e.g., within n milliseconds or seconds of one another.

To locate additional performance attenuations, the anomaly detection module 326 may identify a timeframe in which the attenuated performance was detected and iteratively search the performance data 318 associated with each of the performance metrics within that timeframe. During the search, the anomaly detection module 326 may evaluate the performance data 318 to determine whether the performance metric under evaluation may be characterized as an anomalous performance metric for the selected timeframe. A performance metric may be characterized as an anomalous performance metric where the performance metric crossed a predetermined performance threshold. The performance threshold may be based, for example, on an average value determined for the performance metric. Therefore a performance metric may also be characterized as an anomalous performance metric where the value of the performance metric for the selected timeframe deviates from the average value for the performance metric above a predetermined difference threshold.

As one example, consider the transaction time for a transaction processed by an application 310 hosted at an application server 308. The performance metric, in this example, may be a transaction time performance metric. As noted above, a performance metric may be characterized as an anomalous performance metric based on a predetermined performance threshold or based on an average of the performance metric. A predetermined performance threshold for the transaction time performance metric, in this example, may be set to 4 milliseconds. During a selected timeframe, however, evaluation of the performance data 318 may indicate the transaction time was 7 milliseconds. The transaction time performance metric, in this example, may thus be identified as an anomalous performance metric for the selected timeframe since the transaction time (7 ms) exceeded the performance threshold (4 ms) during the selected timeframe. An evaluation of the performance data 318 for the transaction time performance metric may also indicate the overall average transaction time is 2 milliseconds. A predetermined difference threshold for the transaction time performance metric, in this example, may be set to 3 milliseconds. Because the difference (5 ms) between the average transaction time and the transaction time during the selected timeframe exceeds the predetermined difference threshold (2 ms), the transaction time performance metric may also be characterized as an anomalous performance metric for the selected timeframe. Stated more generally, a performance attenuation for a performance metric may be identified by obtaining a performance average for a selected timeframe and a previous performance average for a previous timeframe prior to the timeframe selected based on an evaluation of performance data associated with the performance metric. A difference between the performance average and the previous performance average may be determined and compared to a predetermined difference threshold. If the difference between the performance average and the previous performance average exceeded the predetermined difference threshold during the timeframe selected, then the performance metric may be associated with a performance attenuation during the timeframe selected.

Upon identifying an anomalous performance metric within the same timeframe as a detected performance attenuation, the anomaly detection module 326 may identify the application 310 or application server 308 associated with the anomalous performance metric as a potential source of the performance attenuation detected. It will be appreciated that the anomaly detection module 326 may identify multiple anomalous performance metrics within the timeframe selected each of which may be a potential source of the performance attenuation detected. Having searched the performance data 318 associated with each of the performance metrics, the anomaly detection module 326 may provide the user interface module 322 with information indicating the applications 310 or application servers 308 associated with an anomalous performance metrics identified. The user interface module 322 may in turn present the information to an administrator thereby allowing the administrator to investigate the potential sources of the performance attenuation detected.

The anomaly detection module 326 may also locate potential sources of attenuated performance based on alerts generated for other applications 310 or application servers 308. The performance data 318 may include information corresponding to alerts that were generated by the performance monitoring agent 304 for applications 310 and application servers 308. The anomaly detection module 326 may thus search the performance data 318 for any alerts generated within the timeframe selected and identify any applications 310 or application servers 308 associated with such alerts as potential sources of the attenuated performance detected.

The anomaly detection module 326 may perform the anomaly detection process automatically in response to an alert received from the performance monitoring agent 304. The anomaly detection module 326 may also perform the anomaly detection process in response to receipt of user input, e.g., at the user interface module 322. An administrator may select via the user interface module 322 an application 310 or an application server 308 and initiate the anomaly detection process for the selected application or application server. The anomaly detection module 326 may additionally perform the anomaly detection process automatically on a periodic basis, e.g., once a day, once a week, once a month etc. An administrator may selectively configure the anomaly detection module 326 to evaluate one or more of the applications or application servers on a periodic basis. The anomaly detection process will be discussed in further detail below with reference to FIG. 4.

The dependency mapping module 328 of the performance evaluation system 300 may be configured to, in operation, generate a dependency map 334 for the applications 310 residing at the application servers 308 based on an evaluation of the performance data 318. The dependency map 334 may be configured to include relationships that identify which applications 310 are related to one another in the enterprise computing system. An application 310 may be related to another application when, for example, the application requests information from the other application, responds to a request from another application, receives information from another application, or provides information to another application. An application 310 that requests and receives information from another application may be described as downstream of the other application, i.e., the application may be a downstream application relative to the other application. An application 310 that responds to requests and provides information to another application may be described as upstream of the other application, i.e., the application may be an upstream application relative to the other application. It will be appreciated that an application 310 may be downstream relative to some applications and upstream relative to other applications. The dependency map 334 may also be configured to indicate whether related applications 310 are upstream or downstream relative to one another. As seen in FIG. 3, the dependency map may be stored at the performance monitoring data store 320.

As noted above the dependency mapping module 328 may identify dependencies between applications 310 based on evaluation of the performance data 318. In particular the dependency mapping module 328 may identify dependencies between applications by correlating performance attenuations of the applications. The dependency mapping module 328 may evaluate the performance data 318 and identify a performance attenuation associated with an application 310. If the dependency mapping module 328 identifies additional performance attenuations associated with another application that occurred within the same timeframe or within a predetermined time period of the performance attenuation, then the dependency mapping module may determine that a dependency exists between the two applications. The dependency mapping module 328 may thus configure the dependency map 334 to include a relationship between the applications.

The dependency mapping module 328 may also be configured to determine which application 310 is the upstream application and which application is the downstream application based on an evaluation of the performance data 318. If the dependency mapping module 328 determines that the performance attenuation of a first application 310 occurred after the performance attenuation of a second application, then the dependency mapping module may identify the first application as a downstream application relative to the second application. Similarly if the dependency mapping module 328 determines that the performance attenuation of the first application occurred before the performance attenuation of the second application, then the dependency mapping module may identify the first application as an upstream application relative to the second application. The dependency mapping module 328 may configure the dependency map 334 to identify whether an application 310 is an upstream application or a downstream application relative to a related application. The dependency mapping module 328 may generate an overall dependency map for all applications 310 of the enterprise computing system 302 or may generate individual dependency maps for each application of the enterprise computing system. Dependency mapping will be discussed in further detail below with reference to FIG. 5.

The dependency map 334 advantageously enables the performance evaluation system to proactively alert management teams of potential performance attenuations in response to a performance attenuation detected at an application. The alert module 330 of the performance evaluation system 300 may be configured to, in operation, identify downstream applications for an application based on the dependency map 334 in response to receipt of a performance attenuation alert for the application. More particularly, the alert module 330 may receive an alert from the performance monitoring agent 304 regarding attenuated performance detected at an application 310. In response to receipt of the alert, the alert module 330 may retrieve the dependency map 334 for the application 310 and identify one or more downstream applications related to the application based on the dependency map. Because attenuated performance was detected at the application 310, attenuated performance might be subsequently expected for the downstream applications. Accordingly the alert module 330 may provide a notification to the management teams of each of the downstream applications indicating that attenuated performance was detected at the upstream application, and to expect possible attenuated performance at the downstream applications. In this way, the management teams may take preventative or remedial measures to prepare for or quickly respond to any attenuated performance that subsequently occurs at the downstream applications. Proactive alerting of performance attenuations will be discussed in further detail below with reference to FIG. 6.

The threshold adjustment module 332 of the performance evaluation system 300 may be configured to, in operation, adjust the performance thresholds used to trigger alerts at the performance monitoring agent 304. In some instances, performance attenuations detected at an application 310 or an application server 308 may be expected and not the result of a technical issue for which remedial measures are needed. During peak hours, for example, the traffic volume at an application server or the latency on the network 316 may increase. As a result an increase in processing usage, memory usage, transaction response time, and processor execution time might not require an alert to notify a management team.

Accordingly the threshold adjustment module 332 may be configured to determine, e.g., whether volume of traffic at an application server 308 has increased or whether the latency on the communication network 316 has increased. In some example implementations, the threshold adjustment module 332 may be configured to assess the volume of traffic or the network latency upon receipt of an alert from the performance monitoring agent 304. If the threshold adjustment module 332 determines that the volume of traffic or the network latency has increased, then the threshold adjustment module may adjust the performance threshold utilized to trigger the alert. In this way, the performance monitoring agent 304 may refrain from providing alerts during periods of high traffic volume or network latency in which attenuated performance might be expected. When the threshold adjustment module 332 determines that the volume of traffic or network latency has decreased, the threshold adjustment module may revert the performance threshold back to the previous level. In response to receipt of an alert, the threshold adjustment module 332 may adjust one or more of the performance thresholds. In some example implementations the threshold adjustment module 332 may be configured to evaluate the performance data 318 to identify time periods of attenuated performance due to repeating patterns of increased traffic volume or network latency. The threshold adjustment module 332 may then automatically adjust performance thresholds during those time periods in a proactive fashion.

Figure 4:
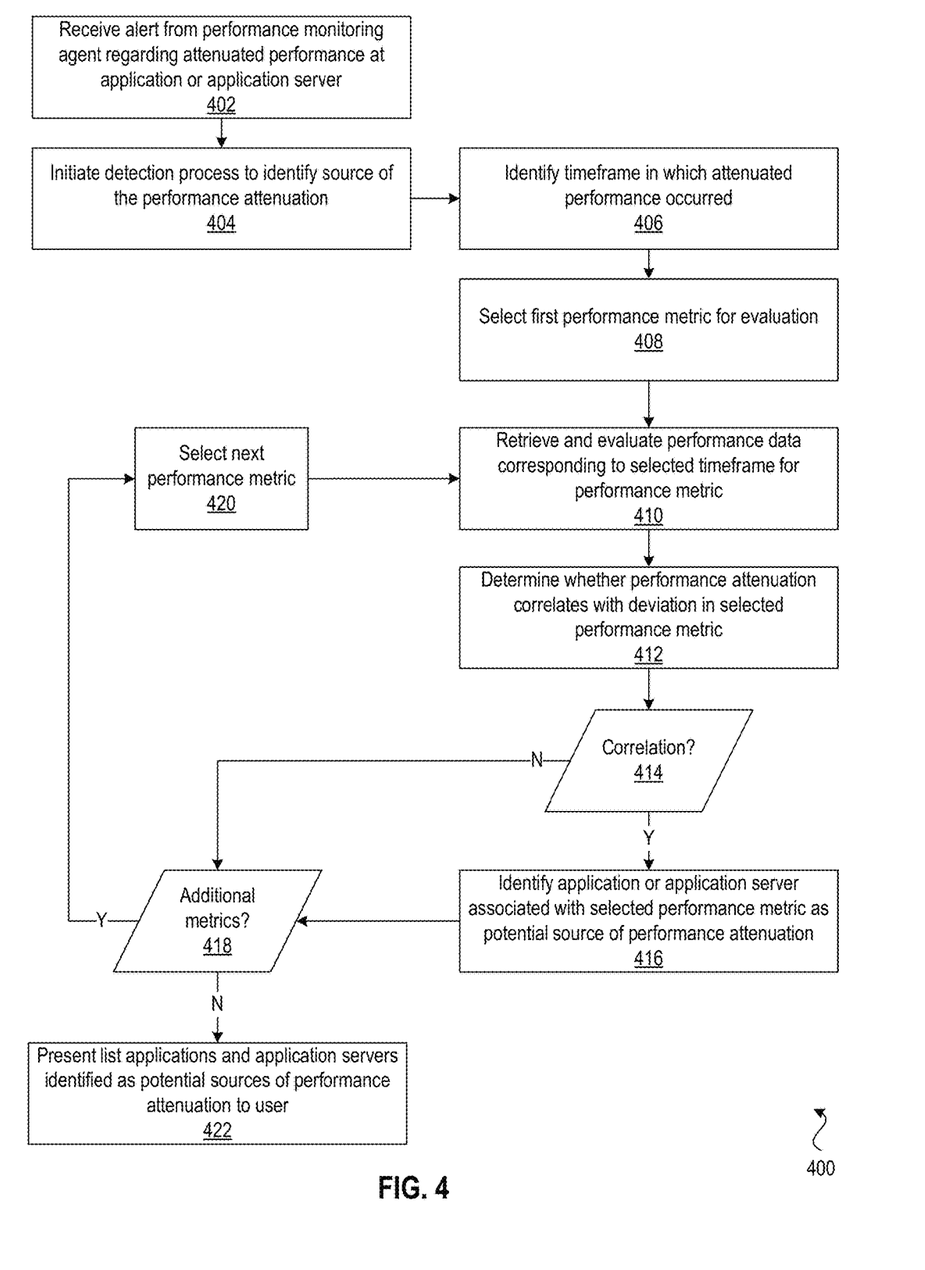
FIG. 4 is a flowchart of example method steps for identifying potential sources of performance attenuations based on evaluations of performance data.

Referring now to FIG. 4, a flowchart 400 of example method steps for identifying potential sources of performance attenuations based on evaluations of performance data is shown. An alert may be received from a performance monitoring agent regarding a performance attenuation detected at an application or an application server (block 402). In response to receipt of the alert, the detection process to identify the source of the performance attenuation may be initiated (block 404). The detection process may be initiated automatically by a detection module of a performance evaluation system or in response to user input at the detection module.

The detection module may identify a timeframe in which the attenuated performance occurred (block 406). The timeframe may be, e.g., a period of milliseconds, seconds, minutes, hours, and so forth. The detection module may then select one of the performance metrics for evaluation (block 408). The detection module may retrieve performance data corresponding to the selected timeframe for the selected performance metric (block 410). The detection module may then determine whether the detected performance attenuation correlates with a deviation in the selected performance metric (block 412). As described above, a performance metric deviation may occur where the a performance metric crosses a performance threshold. Accordingly the detection module may determine that a performance attenuation correlates with a deviation in the selected performance metric when the selected performance metric crossed a performance threshold during or before the timeframe selected. It will also be appreciated that a deviation in a performance metric may also correspond to a performance attenuation at an application or application server associated with that performance metric. The detection module may thus also be described as configured to locate other performance attenuations that correlate with the detected performance attenuation and identify the applications or application servers experiencing the other performance attenuations as potential sources of the detected performance attenuation.

If the detected performance attenuation correlates with a deviation in the selected performance metric (block 414:Y), then the detection module may identify the application or application server associated with the selected performance metric as a potential source of the detected performance attenuation (block 416). Having identified a potential source of the detected performance attenuation—or if the detected performance attenuation does not correlate with a deviate in the selected performance metric (block 414:N)—the detection module may determine whether there are any additional performance metrics to evaluate. If additional performance metrics remain to be evaluated (block 418:Y), then the detection module may select the next performance metric (block 420) and repeat steps 410-416 for the next selected performance metric. Once there are no more performance metrics to evaluate (block 418:N), the detection module may provide a list of the applications or application servers identified as potential sources of the detected performance attenuation to the user interface module for presentation to the user (block 422). If the detection module does not locate additional performance attenuations for the selected timeframe, the detection module may expand the timeframe and repeat the example steps of FIG. 4 for the expanded timeframe. The user may thus investigate the potential sources of the detected performance attenuation and address any technical issues causing the performance attenuation.

As noted above the detection module may perform the detection process for one or more applications or application servers. Applications and application servers may be selected based on user input received via the user interface module or automatically based on a list of applications and application servers. In this example approach, an application or application server may be selected for evaluation as well as a timeframe within which to evaluate the selected application or application server. The detection module may identify a performance attenuation associated with the selected application or application server based on an evaluation of the performance data collected for and associated with the application or application server. The detection module may then iteratively evaluate performance data associated with each of the performance metrics to determine whether any performance attenuations associated with the performance metrics also occurred during or before the selected timeframe. The detection module may identify any applications or application servers associated with additional performance attenuations as potential sources of the performance attenuation that occurred at the application or application server selected.

Figure 5:
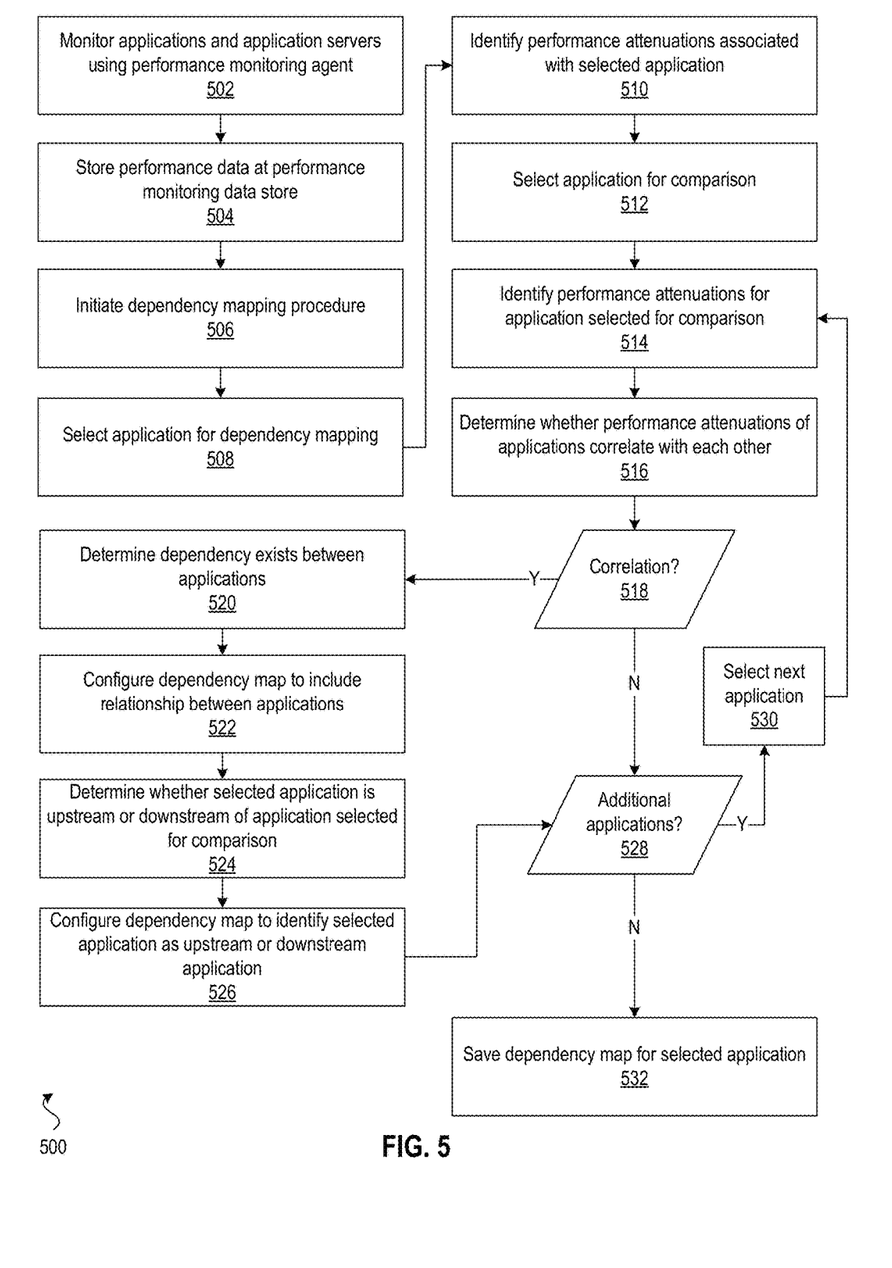
FIG. 5 is a flowchart of example method steps for generating a dependency map identifying dependencies among applications.

Referring now to FIG. 5, a flowchart 500 of example method steps for generating a dependency map identifying dependencies among applications is shown. A performance monitoring agent may monitor applications and application servers in order to collect performance data associated with the operation of those applications and application servers (block 502). The performance monitoring agent may store the performance data at a performance monitoring data store (block 504) where it is thus available for subsequent evaluation. As described above, the performance evaluation system may include a dependency mapping module to map dependencies between applications. As also described above, the dependency mapping module may identify application dependencies by correlating performance attenuations through an evaluation of the performance data.

The dependency mapping module may initiate the dependency mapping procedure (block 506) and select an application for dependency mapping (block 508). Through an evaluation of the performance data, the dependency mapping module may identify previous performance attenuations associated with the selected application (block 510). As noted above performance attenuations may correspond to a deviation of a performance metric associated with the selected application, e.g., when the performance metric crossed a performance threshold. The dependency mapping module may then select an application for comparison (block 512) and identify previous performance attenuations associated with the application selected for comparison (block 514) through an evaluation of the performance data associated with that application. The dependency mapping module may determine whether the previous performance attenuations respectively associated with the selected applications correlate with each other based on the performance data. The dependency mapping module may determine that previous performance attenuations correlate with each other when the previous performance attenuations occurred within a predetermined time period of one another, e.g., within n milliseconds, seconds, minutes, hours, and so forth of each other. The predetermined time period may be selectively configured by a user via, e.g., the user interface module.

If the dependency mapping module determines that the previous performance attenuations for the selected applications correlate with each other (block 518:Y), then the dependency mapping module may determine a dependency exists between the selected applications (block 520). The dependency mapping module may thus configure a dependency map to include a relationship between the applications (block 522). The dependency mapping module may then determine whether the selected application is upstream or downstream of the application selected for comparison (block 524). The dependency mapping module may determine whether the application is an upstream or downstream application relative to the application selected for comparison based on an evaluation of the performance data as described above. The dependency mapping module may thus also configured the dependency map to identify the selected application as an upstream or downstream application (block 526).

Having configured the dependency map—or if there is no correlation between performance attenuations of the selected applications (block 518:N)—the dependency mapping module may determine whether there are additional applications to map dependencies for. If additional application remain for dependency mapping (block 528:Y), the dependency mapping module may select the next application (block 530) and repeat steps 514-526 for the next selected application. Once there are no more applications to map dependencies for (block 528:N), the dependency mapping module may save the dependency map (block 532), e.g., at the performance monitoring data store. As noted above, the dependency mapping module may create an overall dependency map for all applications of an enterprise computing system or may create multiple individual dependency maps for the applications. The dependency mapping procedure may be initiated automatically at periodic intervals (e.g., weekly, monthly, quarterly), upon receipt of user input from a user (e.g., via the user interface module), or subsequent to the deployment of a new application to the enterprise computing system.

Figure 6:
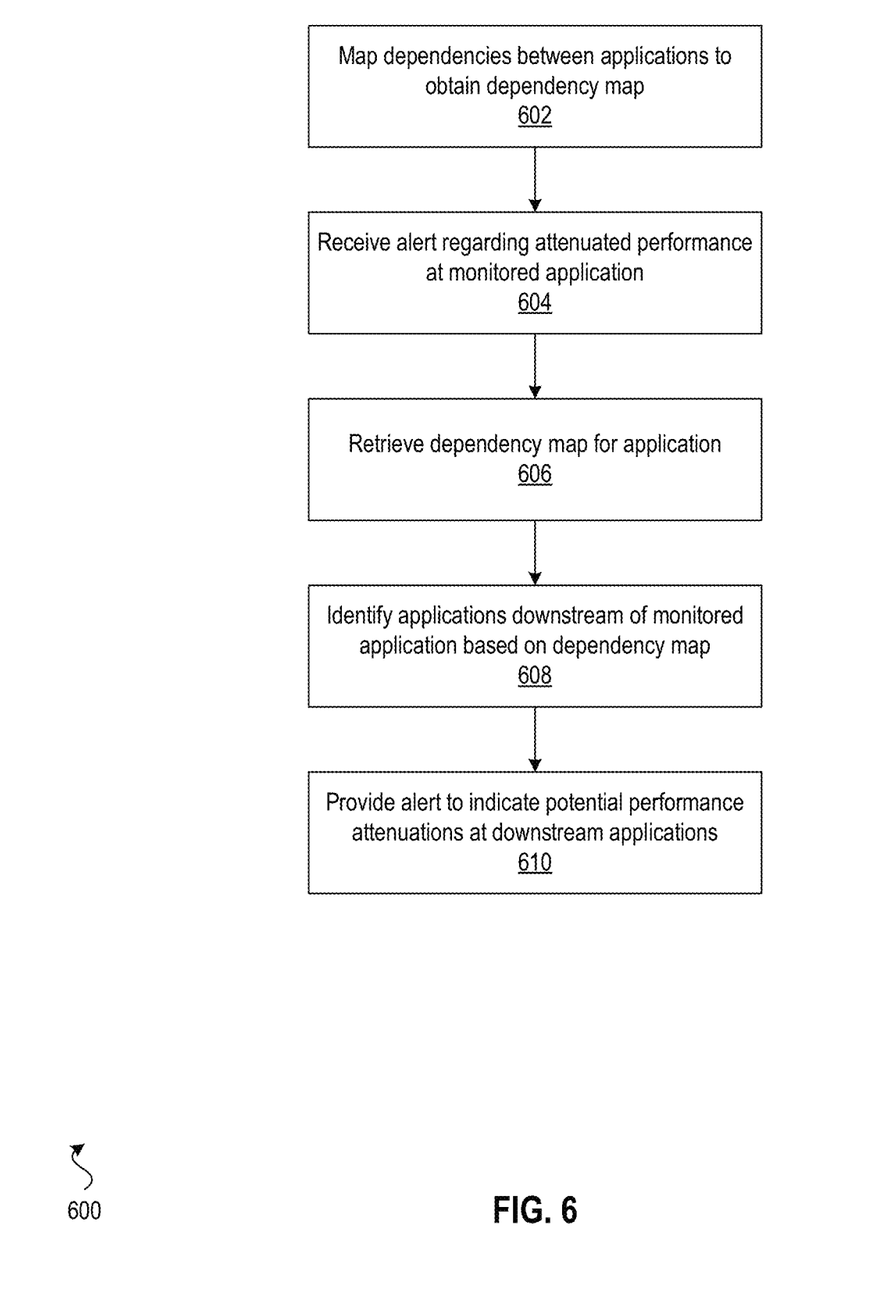
FIG. 6 is a flowchart of example method steps for providing proactive alerts based on a dependency map identifying dependencies between applications.

Referring now to FIG. 6, a flowchart 600 of example method steps for providing proactive alerts based on a dependency map identifying dependencies between applications is shown. A dependency map identifying the dependencies between applications of an enterprise computing system may be obtained (block 602) as described above. A subsequent alert from a performance monitoring agent may be received indicating that a subsequent performance attenuation was detected at a monitored application (block 604). In response to receipt of the subsequent alert, an alert module may retrieve the dependency map for the application (block 606) and identify any applications downstream of the monitored application based on the dependency map (block 608). For each application identified in the dependency map as a downstream application relative to the monitored application, the alert module may provide an alert (e.g., to an administration team) to indicate that potential performance attenuations might occur at the downstream applications (block 610) due to the performance attenuation detected at the monitored application. The alerts may be, e.g., emails sent to an email address associated with an administration team responsible for maintaining the downstream application, an issue ticket created at an issue tracking system, and other types of alerts that will be appreciated by those skilled in the art.

Figure 7:
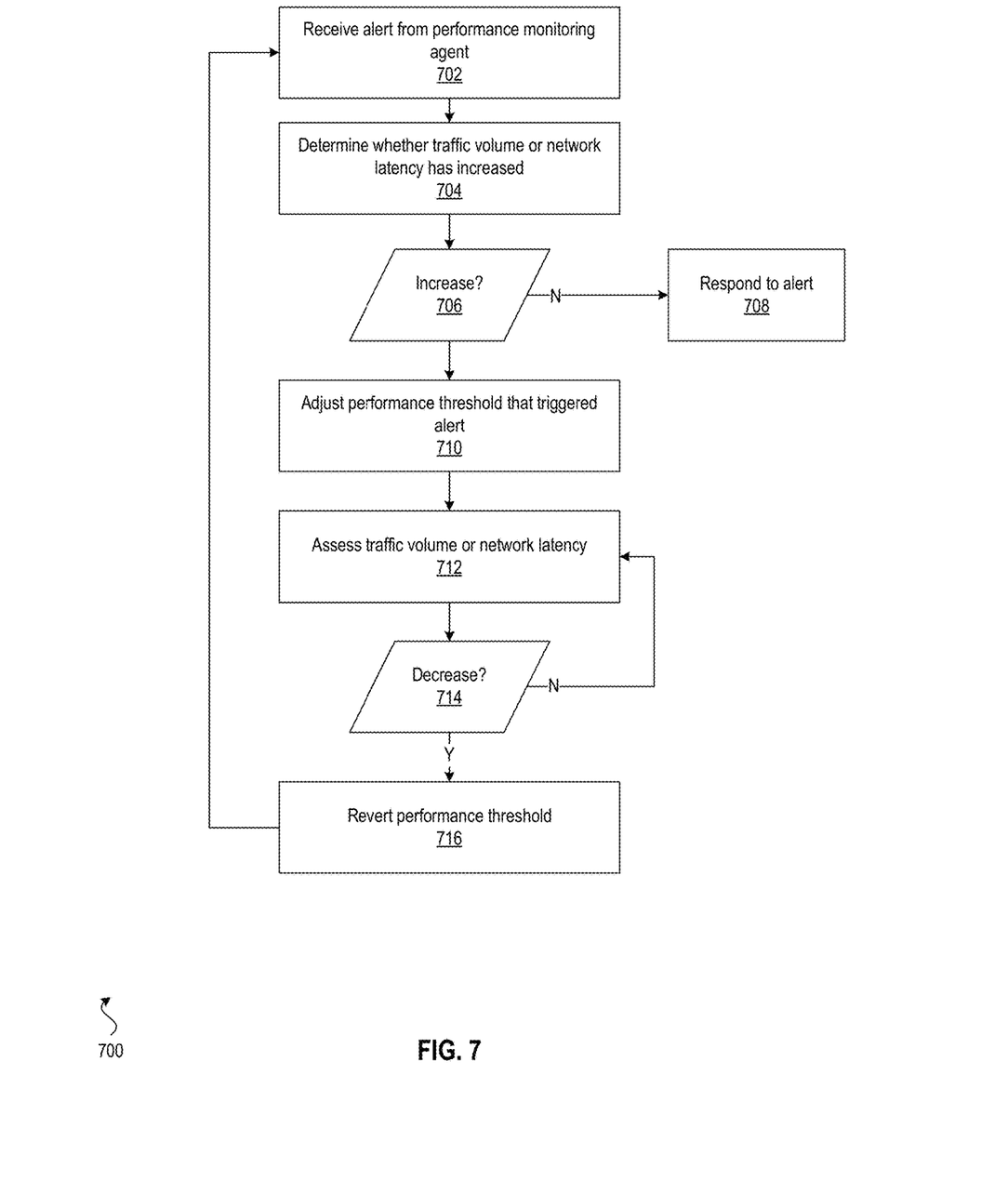
FIG. 7 is a flowchart of example method steps for automatically adjusting performance thresholds of a performance monitoring agent.

Referring now to FIG. 7, a flowchart 700 of example method steps for automatically adjusting performance thresholds of a performance monitoring agent is shown. An alert from a performance monitoring agent may be received (block 702), and a threshold adjustment module of a performance evaluation system may determine whether to adjust the performance threshold based on various criteria. As described above, the threshold adjustment module may determine whether to adjust a performance threshold based on the traffic volume at an application server or the latency of a communication network used to access the application server. The threshold adjustment module may determine whether to adjust a performance threshold based on other types of criteria that will be appreciated by those skilled in the art.

In this example, the threshold adjustment module may determine whether traffic volume or network latency has increased (block 704). If the threshold adjustment module determines that the traffic volume or network latency has not increased (block 706:N), then the system may respond to the alert (block 708) as described above, e.g., by identifying potential sources of the performance attenuation that triggered the alert. If, however, the threshold adjustment module determines that traffic volume or network latency has increased (block 706:Y), then the threshold adjustment module may adjust a performance threshold that triggered the alert (block 710), e.g., a response time performance metric or active thread count metric. When adjusting a performance threshold, the threshold adjustment module may adjust the performance threshold to increase or decrease its value. When adjusting a response time performance threshold due to increased traffic volume or network latency, for example, the threshold adjustment module may increase the response time threshold (e.g., from 4 ms to 7 ms).

The traffic volume or network latency may continually be assessed (block 712) in order to determine whether the traffic volume or network latency has decreased, e.g., back to normal levels. Once the traffic volume or network latency decreases (block 714:Y), the threshold adjustment module may revert the performance threshold (block 716), e.g., back to the previous value before the increase in traffic volume or network latency occurred. For a response time performance metric, for example, the threshold adjustment module may decrease the response time performance threshold (e.g., from 7 ms to 4 ms). Assessment of the traffic volume or network latency may continue (block 712) if the traffic volume or network latency has not yet decreased. As noted above, the threshold adjustment module may also be configured to automatically adjust performance thresholds upon the start of peak usage periods and automatically revert the performance thresholds upon the start of off-peak usage periods. In this way alerts and subsequent remedial efforts might be suppressed for performance attenuations that are expected.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

The invention claimed is:

1. A computer-implemented method of identifying a cause of attenuated performance at a computing system comprising:
   storing, at a data store of a computing device, performance data corresponding to a plurality of performance metrics associated with one or more application servers of a computing system and monitored by a performance monitoring agent;
   receiving, by the computing device, an alert from the performance monitoring agent, the alert having been triggered by a first performance attenuation at one of the one or more application servers;
   selecting, by the computing device, a timeframe in which the first performance attenuation occurred;
   searching, by the computing device, the performance data to identify a second performance attenuation that occurred at one of the one or more application servers during or before the timeframe selected;
   evaluating, by the computing device, the performance data to identify one of the one or more application servers at which the second performance attenuation occurred as a potential source of the first performance attenuation that triggered the alert, wherein evaluating the performance data comprises iterating over the plurality of performance metrics and, for each performance metric of the plurality of performance metrics,
      determining, based on the performance data, that the performance metric crossed a predetermined performance threshold used to trigger alerts during or before the timeframe selected,
      identifying, in response to the determining, the performance metric as an anomalous performance metric, and
      selecting one of the one or more application servers associated with the anomalous performance metric as the potential source of the first performance attenuation;
   determining, by the computing device, whether at least one of: a volume of traffic or network latency has increased;
   responsive to determining that the at least one of: the volume of traffic or the network latency has increased, determining whether the at least one of: the increased volume or traffic or increased network latency corresponds to the first performance attenuation;
   responsive to determining that the at least one of: the increased volume of traffic or the increased network latency corresponds to the first performance attenuation, adjusting, by the computing device, a performance threshold used to trigger alerts associated with one of the plurality of performance metrics; and
   presenting, at a display device of the computing device, information corresponding to at least one of the application servers identified as one of the one or more potential sources of the first performance attenuation.

2. The method of claim 1 wherein:
   the performance data includes alerts triggered for the one or more of the application servers;
   searching the performance data includes identifying an alert triggered for one of the application servers during or before the timeframe selected; and
   the application server identified as the potential source of the first performance attenuation is the application server of the one or more application servers for which an alert was triggered during or before the timeframe selected.

3. The method of claim 1 wherein at least some of the performance metrics are associated with one or more applications of the computing system and further comprising:
   selecting, by the computing device, a first application of the one or more applications for which to create a dependency map;
   identifying, based on the performance data, a first previous performance attenuation associated with the first application and a second previous performance attenuation associated with a second application;
   determining that the first previous performance attenuation correlates with the second previous performance attenuation;
   configuring the dependency map for the first application to include a relationship between the first application and the second application; and
   storing the dependency map at the data store.

4. The method of claim 3 further comprising:
   determining that the first previous performance attenuation associated with the first application correlates with the second previous performance attenuation associated with the second application when the first previous performance attenuation occurs within a predetermined time period of the second previous performance attenuation.

5. The method of claim 4 further comprising:
   determining whether the first previous performance attenuation associated with the first application occurred before or after the second previous performance attenuation associated with the second application; and
   configuring the dependency map to identify the first application as a downstream application or an upstream application relative to the second application responsive to a determination of whether the first previous performance attenuation occurred before or after the second previous performance attenuation.

6. The method of claim 5 further comprising:
   receiving, by the computing device, a subsequent alert from the performance monitoring agent triggered by a subsequent performance attenuation at the first application;
   identifying, by the computing device and based on the dependency map, one or more downstream applications related to the first application; and
   transmitting, by the computing device, to each of the one or more downstream applications a notification indicating the subsequent performance attenuation at the first application.

7. The method of claim 1 wherein:
the second performance attenuation is associated with an application hosted by one of the one or more application servers identified as the potential source of the first performance attenuation that triggered the alert.

8. A system for identifying a cause of attenuated performance at a computing system comprising:
one or more processors;
a display device;
a data store that stores performance data corresponding to a plurality of performance metrics associated with one or more application servers of a computing system and monitored by a performance monitoring agent;
memory storing instructions that, when executed by one of the one or more processors, cause the system to:
evaluate, automatically in response to detecting a performance attenuation at a first application server of the one or more application servers, the performance data to identify a second application server as one of one or more potential sources of the performance attenuation, wherein evaluating the performance data comprises iterating over the plurality of performance metrics and, for each performance metric,
determine, based on the performance data, that the performance metric crossed a predetermined performance threshold used to trigger alerts during or before a timeframe the performance attenuation occurred,
identify, in response, the performance metric as an anomalous performance metric, and
select one of the one or more application servers associated with the anomalous performance metric as one of the one or more potential sources of the performance attenuation;
determining, by the computing system, whether at least one of: a volume of traffic or network latency has increased;
responsive to determining that the at least one of: the volume of traffic or the network latency has increased, determining whether the at least one of: the increased volume or traffic or increased network latency corresponds to the first performance attenuation;
responsive to determining that the at least one of: the increased volume of traffic or the increased network latency corresponds to the first performance attenuation, adjusting a performance threshold used to trigger alerts associated with one of the plurality of performance metrics; and
present, a the display device, information corresponding to at least one of the one or more application servers identified as one of the one or more potential sources of the performance attenuation.

9. The method of claim 1, further comprising:
storing, at the data store, a dependency map associated with an application residing at one of the one or more application servers identified as one of the one or more potential sources of the first performance attenuation, the dependency map indicating one or more additional applications downstream of the application; and
providing, by the computing device for each of the one or more applications, a notification of the second performance attenuation.

10. The method of claim 1, wherein:
adjusting the performance threshold comprises automatically adjusting the performance threshold upon starting a peak usage period or an off-peak usage period.

11. The system of claim 8 wherein:
the performance attenuation is a first performance attenuation; and
evaluating the performance data further comprises
searching the performance data for a second performance attenuation that correlates with the first performance attenuation, and
identifying one of the one or more application servers that is associated with the second performance attenuation as one of the one or more potential sources of the first performance attenuation.

12. The system of claim 11 wherein:
determining that the second performance attenuation correlates with the first performance attenuation comprises determining that the second performance attenuation occurred within a predetermined time period of the first performance attenuation.

13. The system of claim 8 wherein:
the instructions, when executed by one of the one or more processors, further cause the system to
generate a dependency map for an application residing at one of the one or more application servers based on evaluation of the performance data.

14. The system of claim 13 wherein:
the application is a first application; and
generating the dependency map comprises
(i) establishing a relationship between the first application and a second application in the dependency map responsive to a determination that the first application is associated with a first previous performance attenuation that correlates with a second previous performance attenuation associated with the second application, and
(ii) identifying the first application as a downstream application relative to the second application in the dependency map responsive to a determination that the first previous performance attenuation occurred after the second previous performance attenuation, or identifying the first application as an upstream application relative to the second application in the dependency map responsive to a determination that the first previous performance attenuation occurred before the second previous performance attenuation.

15. The system of claim 14 further comprising:
the instructions, when executed by one of the one or more processors, further cause the system to
receive an alert from the performance monitoring agent indicating a subsequent performance attenuation at the first application,
identify one or more downstream applications related to the first application based on the dependency map, and
transmit for each of the one or more downstream applications a notification indicating the subsequent performance attenuation at the first application.

16. The system of claim 15 further comprising:
the instructions, when executed by one of the one or more processors, further cause the system to:
revert the performance threshold responsive to a determination that the volume of traffic or the network latency has decreased.

* * * * *